(12) United States Patent
Timmons et al.

(10) Patent No.: US 9,365,120 B2
(45) Date of Patent: Jun. 14, 2016

(54) TECHNIQUES FOR ENHANCED BATTERY PACK RECHARGING

(71) Applicants: Adam Timmons, Birmingham, MI (US); Euthemios N Stamos, Rochester Hills, MI (US); Thomas J Szymkowski, Farmington Hills, MI (US); Charlie T Accad, Warren, MI (US); Gary J Burlak, Lake Orion, MI (US); Rami Abousleiman, Auburn Hills, MI (US)

(72) Inventors: Adam Timmons, Birmingham, MI (US); Euthemios N Stamos, Rochester Hills, MI (US); Thomas J Szymkowski, Farmington Hills, MI (US); Charlie T Accad, Warren, MI (US); Gary J Burlak, Lake Orion, MI (US); Rami Abousleiman, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 459 days.

(21) Appl. No.: 13/901,696

(22) Filed: May 24, 2013

(65) Prior Publication Data

US 2014/0292283 A1 Oct. 2, 2014

Related U.S. Application Data

(60) Provisional application No. 61/806,711, filed on Mar. 29, 2013.

(51) Int. Cl.
*B60L 11/18* (2006.01)
*H02J 7/00* (2006.01)

(52) U.S. Cl.
CPC ......... *B60L 11/1809* (2013.01); *B60L 11/1866* (2013.01); *H02J 7/00* (2013.01); *H02J 7/0014* (2013.01); *Y02T 10/7005* (2013.01); *Y02T 10/7055* (2013.01); *Y02T 10/7061* (2013.01)

(58) Field of Classification Search
CPC .................................................. B60L 11/1809
USPC ....................................................... 320/152
See application file for complete search history.

(56) References Cited

U.S. PATENT DOCUMENTS

| 5,804,944 | A | * | 9/1998 | Alberkrack | H02J 7/0011 320/163 |
|---|---|---|---|---|---|
| 7,126,312 | B2 | * | 10/2006 | Moore | H02J 7/0016 320/116 |
| 8,258,793 | B2 | | 9/2012 | Frisch et al. | |
| 8,710,800 | B2 | * | 4/2014 | Gibbs | H01M 10/441 320/116 |
| 2004/0257042 | A1 | * | 12/2004 | Liu | H01M 10/441 320/130 |
| 2007/0132456 | A1 | * | 6/2007 | Salman | G01N 27/045 324/426 |
| 2007/0257642 | A1 | * | 11/2007 | Xiao | H02J 7/0026 320/134 |
| 2008/0030171 | A1 | * | 2/2008 | Villefrance | H01M 10/486 320/150 |
| 2009/0306915 | A1 | * | 12/2009 | Schoch | G01R 31/3651 702/63 |
| 2010/0250162 | A1 | * | 9/2010 | White | G01R 31/3679 702/63 |
| 2011/0060538 | A1 | * | 3/2011 | Fahimi | G01R 31/3679 702/63 |
| 2011/0285356 | A1 | * | 11/2011 | Maluf | H02J 7/0052 320/139 |
| 2011/0301931 | A1 | * | 12/2011 | Gering | G01R 31/3679 703/13 |
| 2014/0292283 | A1 | * | 10/2014 | Timmons | B60L 11/1809 320/152 |

* cited by examiner

*Primary Examiner* — Richard Isla Rodas
*Assistant Examiner* — Dung V Bui
(74) *Attorney, Agent, or Firm* — Ralph E. Smith

(57) ABSTRACT

A method includes detecting that a battery pack requires charging and is currently operable for recharging. The method can identify a specific cell having a highest voltage in response to the detecting. The method can then recharge each cell of the battery pack to a predetermined voltage that is a sum of (i) a maximum open circuit voltage of the specific cell and (ii) a voltage based on a resistance of and a first current supplied to the specific cell. When a temperature of the specific cell is less than a predetermined temperature or an age of the specific cell is greater than a predetermined age, the method includes recharging each cell to the predetermined voltage at less than the first current when (i) a predetermined period has elapsed or (ii) a voltage of the specific cell is less than a voltage threshold.

20 Claims, 3 Drawing Sheets

TECHNIQUES FOR ENHANCED BATTERY PACK RECHARGING

CROSS-REFERENCE TO RELATED APPLICATIONS

This application claims the benefit of U.S. Provisional Application No. 61/806,711, filed on Mar. 29, 2013. The disclosure of the above application is incorporated herein by reference in its entirety.

FIELD

The present disclosure relates generally to techniques for enhanced battery pack recharging and, more particularly, to techniques for time-optimized recharging of battery packs.

BACKGROUND

An electric vehicle (EV) refers to any vehicle that can be powered by an electric motor. More specifically, a battery pack of the EV can provide a current to the electric motor, which in turn can propel the EV. The battery pack can include a plurality of battery cells, such as lithium-ion (Li-ion) battery cells. One example of an EV is a hybrid EV (HEV). An HEV typically includes an internal combustion engine, which can be used to periodically recharge the battery pack and/or to periodically propel the vehicle, thereby extending the range of the vehicle.

Another example of an EV is a battery electric vehicle (BEV). A BEV is a battery-only vehicle and thus does not include an internal combustion engine. Both BEVs and a specific type of HEVs (plug-in HEVs, or PHEVs), can recharge their battery packs with residential electrical power using, for example, an external charging unit. A user can plug the external charging unit into a BEV or PHEV to enable charging, provided other conditions are satisfied, e.g., the BEV or PHEV is in park and is turned off. The battery pack of the BEV or the PHEV can then be recharged during a recharging period, e.g., overnight.

SUMMARY

In one form, a method is provided in accordance with the teachings of the present disclosure. The method can include detecting, at a controller of an electric vehicle, the controller including one or more processors, that (i) a battery pack of the electric vehicle requires recharging and (ii) the battery pack is currently operable to be recharged by an external charging unit. The battery pack can include a plurality of cells. The method can include identifying, at the controller, a specific cell of the plurality of cells that has a highest voltage in response to the detecting. The method can also include commanding, by the controller, the external charging unit to recharge each cell of the battery pack to a predetermined voltage that is a sum of (i) a maximum open circuit voltage of the specific cell and (ii) a voltage based on a resistance of the specific cell and a first current supplied to the specific cell.

In another form, a method is provided in accordance with the teachings of the present disclosure. The method can include detecting, at a controller of an electric vehicle, the controller including one or more processors, that (i) a battery pack of the electric vehicle requires recharging and (ii) the battery pack is currently operable to be recharged by an external charging unit. The battery pack can include a plurality of cells. The method can include identifying, at the controller, a specific cell of the plurality of cells that has a highest voltage in response to the detecting. The method can include commanding, by the controller, the external charging unit to recharge each cell of the battery pack to a predetermined voltage that is a sum of (i) a maximum open circuit voltage of the specific cell and (ii) a voltage based on a resistance of the specific cell and a first current supplied to the specific cell. The method can include determining, at the controller, a temperature of the specific cell and an age of the specific cell. The method can include determining, at the controller, that the recharging of each cell of the battery pack is complete when the temperature is greater than or equal to a first predetermined temperature and the age is less than or equal to a first predetermined age. The method can include commanding, by the controller, the external charging unit to decrease a current supplied to each cell of the battery pack to zero when the temperature is less than the first predetermined temperature or the age is greater than the first predetermined age. The method can include determining, at the controller, that the recharging of each cell of the battery pack is complete when a voltage of the specific cell is greater than or equal to a voltage threshold. The method can also include commanding, by the controller, the external charging unit to recharge each cell of the battery pack to the predetermined voltage at a second current that is less than the first current when a predetermined period has elapsed or the voltage of the specific cell is less than the voltage threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
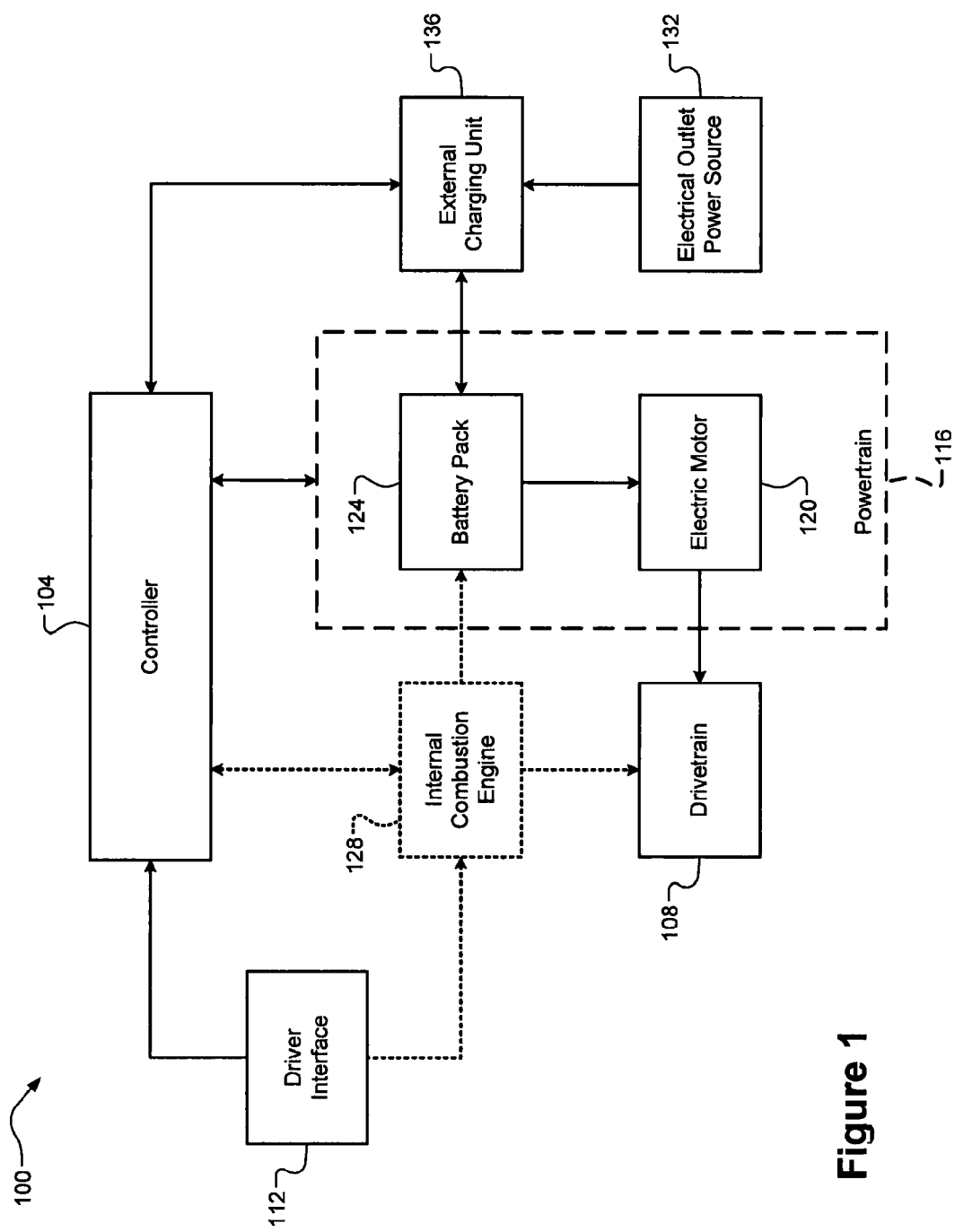
FIG. 1 is a functional block diagram of an electric vehicle (EV) including a controller according to the principles of the present disclosure.

As previously described, an electric vehicle (EV) includes a battery pack that provides current to an electric motor, which in turn can propel the EV. The battery pack can be periodically recharged via a variety of power sources. In a plug-in hybrid electric vehicle (PHEV) or a battery electric vehicle (BEV), for example, the battery pack can be recharged with residential electrical power via an external charging unit. Typically, the battery pack is recharged when its state of charge (SOC) approaches zero. The SOC can refer to an amount of charge or energy remaining in the battery pack. When the SOC approaches full charge during recharging, systems often transition to trickle charging, e.g., when the SOC is a few percent from full charge. Trickle charging refers to providing only a small amount of current to the battery pack. Trickle charging can be used because a state of health (SOH) of the battery pack can change over time and thus may be unknown, and therefore supplying excessive current to the battery pack should be avoided to prevent damage to the battery pack. Recharging of the battery pack using trickle charging, however, can take a significant amount of time.

Accordingly, techniques are presented for controlling recharging of a battery pack. The techniques can provide for faster recharging of battery packs in electric vehicles or other suitable devices. The techniques can provide faster recharging of a battery pack comprising a plurality of cells by recharging each cell of the battery pack to a predetermined voltage that is a sum of (i) a maximum open circuit voltage of a specific cell and (ii) an additional voltage component based on a resistance of a specific cell and a current supplied to the specific cell. This specific cell can be identified as having a highest voltage of the plurality of cells in the battery pack. This additional voltage component, however, represents an ohmic potential difference between the maximum open circuit voltage of the specific cell and a voltage of the specific cell in the presence of a current. In other words, this additional voltage component is not a component of the actual open circuit voltage of the specific cell, because after the external charging unit is disconnected, the voltage will eventually be the steady-state open circuit voltage.

By recharging the cells of the battery pack to this predetermined voltage, which is greater than the maximum open circuit voltage of the specific cell, the techniques can thereby achieve faster, i.e., time-optimized, recharging of the battery pack. Because the additional voltage component varies based on resistance, however, recharging of the cell of the battery pack at constant power based on the predetermined voltage may not achieve a full charge, i.e., the maximum open circuit voltage for each cell. More specifically, as a temperature of the cell decreases and/or an age of the cell increases, the resistance of the cell can increase. The techniques, therefore, can determine whether the temperature of the specific cell is less than a first temperature or the age of the specific cell is greater than a first age after the initial recharging to the predetermined voltage. If neither of these conditions is true, then the battery pack should be fully charged and recharging can end. It should be appreciated that while the techniques are described with respect to temperature and age of the specific cell of the battery pack, the techniques can alternatively determine and utilize temperature and/or age of the battery pack as a whole.

If at least one of these conditions is true, however, the techniques can decrease the current supplied to the cells of the battery pack. In some implementations, the current can be decreased to zero, which can also be referred to as a "rest period." During this period of decreased current, the techniques can monitor both duration of the period, i.e., duration of the rest period, and a voltage of the specific cell. The techniques can then determine whether the duration of the period is greater than a predetermined period or the voltage of the cell is less than a voltage threshold. For example, the voltage threshold can be the maximum open circuit voltage of the cell or a voltage slightly less than the maximum open circuit voltage of the cell. If the voltage of the cell is greater than the voltage threshold, charging can end. Otherwise, however, the technique can recharge the cells of the battery pack to the predetermined voltage using lesser current, i.e., less than the last current used during recharging. The duration of the predetermined period can be sufficiently long such that the cells of the battery pack can then be recharged using less than the first current without charging immediately ending.

The same process can then repeat a plurality of times using a plurality of different thresholds for temperature and/or age. As such, the techniques can perform a plurality of determinations of whether the temperature and/or age exceed corresponding thresholds and, accordingly, could command rest periods, and, if necessary, could decrease the current supplied for recharging of the cells of the battery pack further. The techniques of the present disclosure may be particularly useful in their application to PHEVs and BEVs because the battery packs in these vehicles (i) can be very large in size and capacity, (ii) can be exposed to extreme temperatures, and (iii) can age significantly over a lifetime of the vehicle, which is typically much longer than other devices having rechargeable battery packs, e.g., due to the frequent usage of vehicles in comparison to other devices. While the techniques of the present disclosure are described with specific reference to battery packs for PHEVs and BEVs, however, it should be appreciated that the techniques of the present disclosure could also be implemented in any suitable devices having rechargeable battery packs, e.g., a rechargeable power tool.

Referring now to FIG. 1, a functional block diagram of an electric vehicle (EV) 100 is illustrated. It should be appreciated that the EV 100 can be any suitable EV having a battery pack that can be recharged via electrical outlet power (PHEV, BEV, etc.). The EV 100 can include a controller 104 that controls operation of the EV 100. The controller 104 can also be referred to as an electric vehicle control unit (EVCU). Specifically, the controller 104 can control drive torque supplied to a drivetrain 108 in response to a torque request via a driver interface 112. The drivetrain 108 can be any suitable vehicle drivetrain that can propel the vehicle using the drive torque, e.g., four wheels. The driver interface 112 can include any suitable devices configured to allow a driver of the EV 100 to provide input relative to the torque request, e.g., an accelerator pedal. The driver interface 112 could also include a suitable display device to notify the driver of the SOC of EV 100, e.g., when fully charged.

The drive torque can be supplied to the drivetrain 108 from powertrain 116. The powertrain 116 can include an electric motor 120 and a battery pack 124. The battery pack 124 can supply current to the electric motor 120, which causes the electric motor 120 to be rotatably driven to generate the drive torque. In a PHEV configuration, the EV 100 could optionally include an internal combustion engine 128. In some implementations, the drive torque may also be supplied periodically from the internal combustion engine 128, and therefore the internal combustion engine 128 could also be included as part of the powertrain 116. The internal combustion engine 128 can draw in air, which can be mixed with fuel and combusted within cylinders to rotatably drive a crankshaft and generate drive torque. In some implementations, the internal combustion engine 128 can be utilized to recharge the battery pack 124, e.g., during driving of the EV 100.

The battery pack 124 can be also be recharged by an electrical outlet power source 132 via an external charging unit 136. The electrical outlet power source 132 can output residential electrical power, such as 240 volts (V) AC at 50-60 Hertz (Hz). The external charging unit 136 can also be referred to as electric vehicle supply equipment (EVSE). For example, the external charging unit 136 can be an alternating current (AC) charging station capable of providing, for example, 7.2 kilowatts (kW) of power (240V AC, 30 amps (A)). It should be appreciated that the external charging unit 136 could also be another suitable external charging unit. In order to enable the battery pack 124 to be operable for recharging, a power cord (not shown) of the external charging unit 136 can be plugged into a receptacle (not shown) of the EV 100, and a handshake process can occur between the controller 104 and the external charging unit 136 to confirm that the battery pack 124 is currently operable for recharging.

Figure 2:
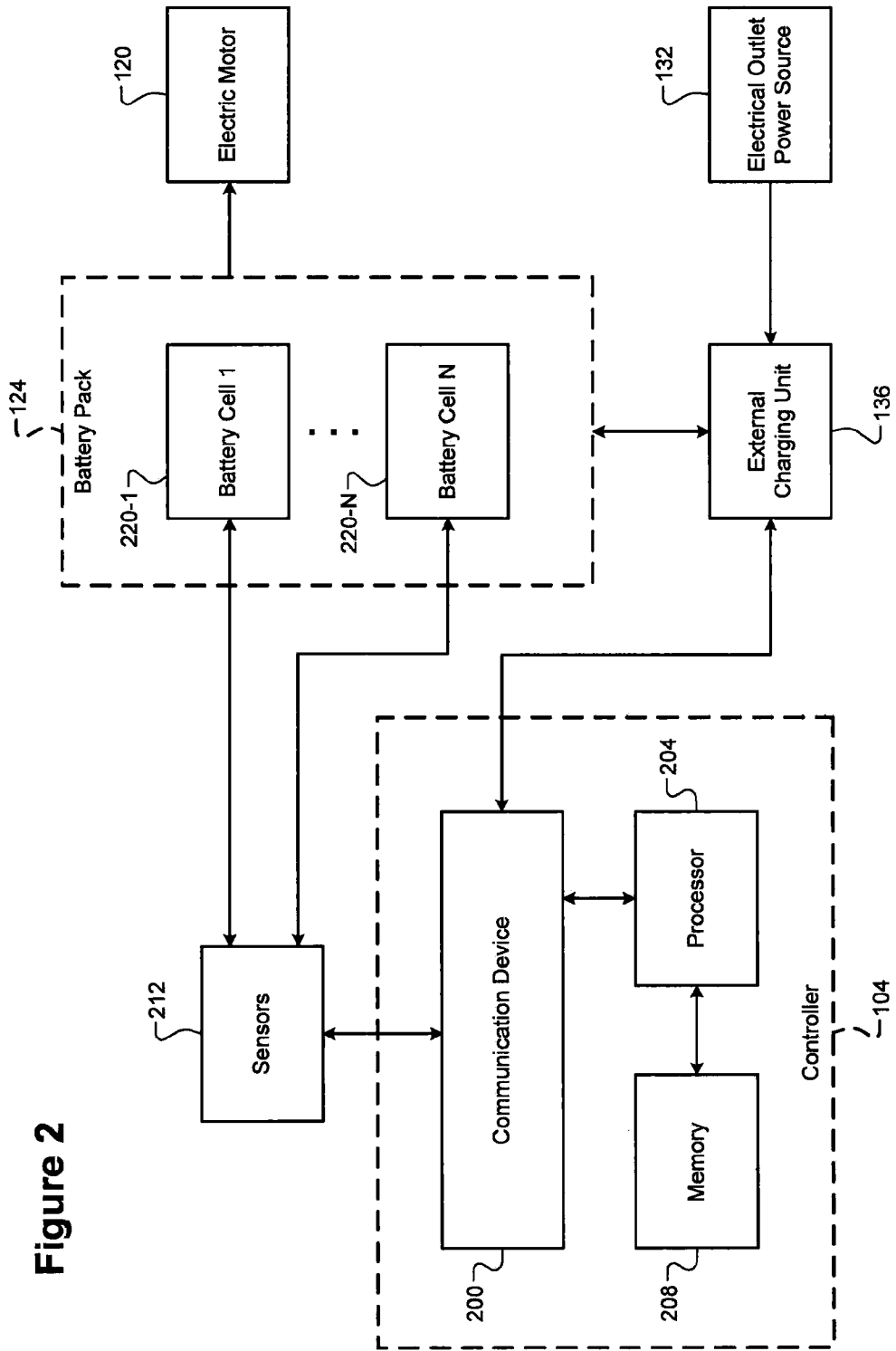
FIG. 2 is a functional block diagram of the controller of FIG. 1 according to the principles of the present disclosure.

Referring now to FIG. 2, a functional block diagram of the controller 104 and the battery pack 124 is illustrated. The controller 104 can include a communication device 200, a processor 204, and a memory 208. The controller 104 can also interact with one or more sensors 212 (hereinafter "sensors 212"). While the sensors 212 are shown as separate standalone sensors, it should be appreciated that the sensors 212 can be implemented as part of the controller 104 and/or as part of the battery pack 124. The communication device 200 can include any suitable components, e.g., a transceiver, suitable for communication with other components of the EV 100 via a controller area network (CAN) or another suitable network. These other components can include, for example, the external charging unit 136 and the sensors 212.

The processor 204 can control operation of the controller 104. It should be appreciated that the term "processor" as used herein can refer to both a single processor and two or more processors operating in a parallel or distributed architecture. Specifically, the processor 204 can control functions including, but not limited to loading/executing an operating system of the controller 104, controlling communication between the controller 104 and other components, e.g., the external charging unit 136, via the communication device 200, processing information from the sensors 212, and/or controlling read/write operations at the memory 208. The memory 208 can be any suitable computer storage medium (flash, hard disk, etc.) configured to store information at the controller 104, such as instructions that, when executed by the processor 204, cause the controller 104 to execute the techniques of the present disclosure.

The battery pack 124 can include a plurality of battery cells 220-1 . . . 220-N (hereinafter "battery cells 220," N being an integer greater than 1). The battery cells 220 can be configured in series, in parallel, or a combination thereof. For example, the battery cells 220 can be Li-ion battery cells. In a series configuration of the battery pack 124, the external charging unit 136 can supply a single current, e.g., the first current, to each of the cells 220 of the battery pack 124. In some implementations, the recharging of the battery pack 124 can also include charge balancing between the battery cells 220. The sensors 212 can measure various parameters of the battery cells 220 (current, voltage, temperature, etc.). Other parameters, such as internal resistance and age (or SOH), can be calculated or estimated using these measured parameters. It should be appreciated that the terms "cell" or "cell 220" as used hereinafter can refer to both a single cell of the battery pack 124 and two or more cells, e.g., all of the cells, of the battery pack 124.

The processor 204 can also wholly or partially execute the techniques according to some implementations of the present disclosure. The processor 204 can first detect whether the battery pack 124 of the EV 100 requires recharging. For example, the processor 204 can determine that the battery pack 124 requires recharging when the SOC of the battery pack 124 is less than a predetermined threshold, such as 100%. It should be appreciated that the processor 204 could also determine that the battery pack 124 requires charging when other parameters, such as the open circuit voltage of cells 220, are less than a predetermined threshold, e.g., a maximum open circuit voltage of the cell 220. These parameters for determining whether the battery pack 124 requires recharging can be obtained from the sensors 212 and communicated to the processor 204 by the communication device 200.

The processor 204 can also detect whether the battery pack 124 of the EV 100 is currently operable for recharging via the external charging unit 136. In order to be operable for recharging via the external charging unit 136, a power cord of the external charging unit 136 should be plugged into a receptacle of the EV 100. Other conditions can also require satisfying, such as the EV 100 being in park and turned off. The processor 204 can receive one or more signals indicating that these conditions are satisfied from the sensors 212 or other suitable sensors via the communication device 200. In some implementations, the processor 204 can also perform a handshake process with the external charging unit 136. This handshake process can include the processor 204 sending an inquiry to the external charging unit 136 via the communication device 200, to which the external charging unit 136 can respond when the battery pack 124 is currently operable for recharging. For example, the signals communicated during the handshake process can be pulse-width modulated (PWM) signals.

When the battery pack 124 requires recharging and is currently operable for recharging, the processor 204 can command the external charging unit 136 to recharge the cells of the battery pack to a predetermined voltage ($V_{max}$) corresponding to a specific cell 220 of the battery pack 124 that has a highest voltage. By recharging each cell 220 of the battery pack 124 to this predetermined voltage $V_{max}$ for the specific cell 220 having the highest voltage, the processor 204 can avoid overcharging the battery pack 124. For example only, the predetermined voltage $V_{max}$ can be approximately 4.14V and the recharging can occur at a constant power $P_{con}$ of approximately 6.6 kW. During recharging, a first current ($I_1$) supplied to each cell 220 may be continuously (linearly or non-linearly) decreased or periodically decreased as its SOC (or its voltage) increases. In some implementations, the processor 204 can generate the command, which can then be transmitted to the external charging unit 136 by the communication device 200. It should be appreciated that while the techniques of the present disclosure describe the controller 104 (and specifically, the processor 204) as "commanding" the external charging unit 136 to supply specific currents, the controller 104 (the processor 204) itself may control adjustment of (or modulate) a steady current that is supplied by the external charging unit 136 to obtain these specific currents.

The predetermined voltage $V_{max}$ can be a predetermined voltage of the specific cell 220 that has a highest voltage. The predetermined voltage $V_{max}$ can be a sum of (i) a maximum open circuit voltage for the specific cell 220 ($V_{cell-max}$) and (ii) an additional voltage component ($V_{add}$) from a resistance of the specific cell 220 ($R_{cell}$) and the first current supplied to the specific cell 220. As previously mentioned, however, while the supplied power remains constant at $P_{con}$ during this initial recharging, the additional voltage component $V_{add}$, and therefore the predetermined voltage $V_{max}$, may vary as a function of the first current supplied to the specific cell 220 ($V_{max}=V_{max-cell}+I_1 \times R_{cell}$). Because the predetermined voltage $V_{max}$ can vary as a function of the first current $I_1$, the processor 204 can use a lookup table to obtain the predetermined voltage $V_{max}$. The lookup table can include varying predetermined values for the predetermined voltage $V_{max}$ based on various values for the first current $I_1$. The lookup table can be stored at the memory 208 and the processor 204 can access the lookup table at the memory 208. For example, this lookup table can be generated during testing and preloaded into the memory 208 during production of the EV 100. The first current I1 can be determined based on at least one of a plurality of parameters including, but not limited to: SOC, maximum and minimum cell temperatures, maximum and minimum cell voltages, battery pack temperature, battery pack voltage, on-board control module maximum current, and battery supplier-defined maximum current.

The additional voltage component $V_{add}$ can also be affected by changes in the resistance $R_{cell}$ ($V_{max}=V_{max-cell}+I_1 \times R_{cell}$). As previously mentioned, two parameters that can affect the resistance $R_{cell}$ are temperature and age. A temperature of the specific cell 220 ($T_{batt}$) can be measured, e.g., using the sensors 212. The temperature $T_{batt}$ can represent a temperature for the specific cell 220 or for the battery pack 124 as a whole. Age, on the other hand, can be indicated by the SOH of the specific cell 220. While the exact SOH may be unknown, the SOH can be estimated in order to determine an age of the cell ($AGE_{batt}$). Again, the age $AGE_{batt}$ can represent an age for the specific cell 220 or for the battery pack 124 as a whole. In some implementations, the SOH can be estimated based on the resistance $R_{cell}$ to obtain an estimated SOH (e.g., 300%/$SOH_R$−200%) where, for example, $SOH_R$ can be calculated by dividing the resistance $R_{cell}$ by a resistance of the specific cell 220 at the beginning of its life ($R_{new}$).

Temperature and age, therefore, can be used as conditions (with corresponding thresholds) to determine whether the initial recharging to the predetermined voltage $V_{max}$ at the constant power $P_{con}$ should have achieved a full charge. In other words, when the battery pack 124 is exposed to extreme temperature or when the battery pack 124 has aged significantly, the recharging to the predetermined voltage $V_{max}$ at the constant power $P_{con}$ may have been insufficient to achieve the full charge. Therefore, the processor 204 can determine whether the temperature $T_{batt}$ is less than a first temperature threshold ($T_1$) or the age $AGE_{batt}$ is greater than a first age threshold ($AGE_1$). For example only, the first temperature threshold $T_1$ can be between 15 and 17 degrees Celsius, and the first age threshold $AGE_1$ can be based on an estimate $SOH_R$ of approximately 88%.

When neither of these conditions is true, the processor 204 can determine that recharging of the battery pack 124 is complete. For example, the processor 204 could output a charge complete signal, e.g., to the driver interface 112, and/or notify the external charging unit 136. When at least one of these conditions are true, however, the processor 204 can command the external charging unit 136 to decrease a current supplied to each cell 220 from the first current $I_1$ to a second current ($I_2$). For example, the second current $I_2$ may be zero, and this period may be referred to as the rest period. The purpose of this rest period can be to determine whether the voltage of the specific cell 220 $V_{cell}$ falls below a voltage threshold ($V_{TH}$). The voltage threshold $V_{TH}$ can be a voltage that is considered full charge. For example, the voltage threshold $V_{TH}$ can be equal to the maximum open circuit voltage of the specific cell 220 $V_{cell-max}$ or a voltage slightly less than $V_{cell-max}$.

The processor 204 can monitor duration of this rest period (t) and the voltage $V_{cell}$. When the duration of the rest period t exceeds a predetermined period ($t_{TH}$), i.e., when the predetermined period $t_{TH}$ has elapsed, or when the voltage $V_{cell}$ is less than the voltage threshold $V_{TH}$. For example only, the predetermined period $t_{TH}$ may be 30 minutes. When the voltage $V_{cell}$ has not fallen below the voltage threshold $V_{TH}$, the processor 204 can determine that the battery pack 124 is fully charged, and can proceed accordingly as previously discussed. When the voltage $V_{cell}$ is less than the voltage threshold $V_{TH}$, however, the processor 204 can command the external charging unit 136 to supply a lesser current to recharge each cell 220 to the predetermined voltage $V_{max}$.

This lesser current can be a current less than the first current $I_1$, and can also be referred to as a third current $I_3$. For example, the third current $I_3$ may be a predetermined offset from the first current $I_1$. When the predetermined voltage $V_{max}$ has been reached, the processor 204 can determine that recharging is complete, and can proceed accordingly as previously discussed. It should be appreciated, however, that the processor 204 can repeat the process above for one or more additional iterations. More specifically, the processor 204 can then determine whether the temperature $T_{batt}$ or the age $AGE_{batt}$ exceed other corresponding thresholds. These thresholds can be more extreme than the previous thresholds $T_1$ and $AGE_1$.

For example, the processor 204 could determine whether the temperature $T_{batt}$ is less than a second temperature $T_2$ or the age $AGE_{batt}$ is greater than a second age $AGE_2$. The second temperature $T_2$ can be less than the first temperature $T_1$, and the second age $AGE_2$ can be greater than the first age $AGE_1$. In this manner, the processor 204 can again determine whether the previous recharging should have achieved a full charge. When at least one of these conditions is true, however, the processor 204 can again command another reduced current period, i.e., rest period, defined by a fourth current $I_4$ that, for example, could be zero current, or of the same a different duration as any other period of current use or when the voltage $V_{cell}$ is below the voltage threshold $V_{TH}$ at the end of this next rest period, the processor 204 can command the external charging unit 136 to decrease the current supplied to each cell 220 to a lesser current. It should be appreciated that a different voltage threshold than the voltage threshold $V_{TH}$ could also be used.

This lesser current can be a current less than the third current $I_3$, and can also be referred to as a fifth current $I_5$. For example, the fifth current $I_5$ may be a predetermined offset from the third current $I_3$. When the predetermined voltage $V_{max}$ has been reached, the processor 204 can determine that recharging is complete, and can proceed accordingly as previously discussed. However, as conferred earlier, this process could be repeated again, and could continue to be repeated as many times as desired.

Figure 3:
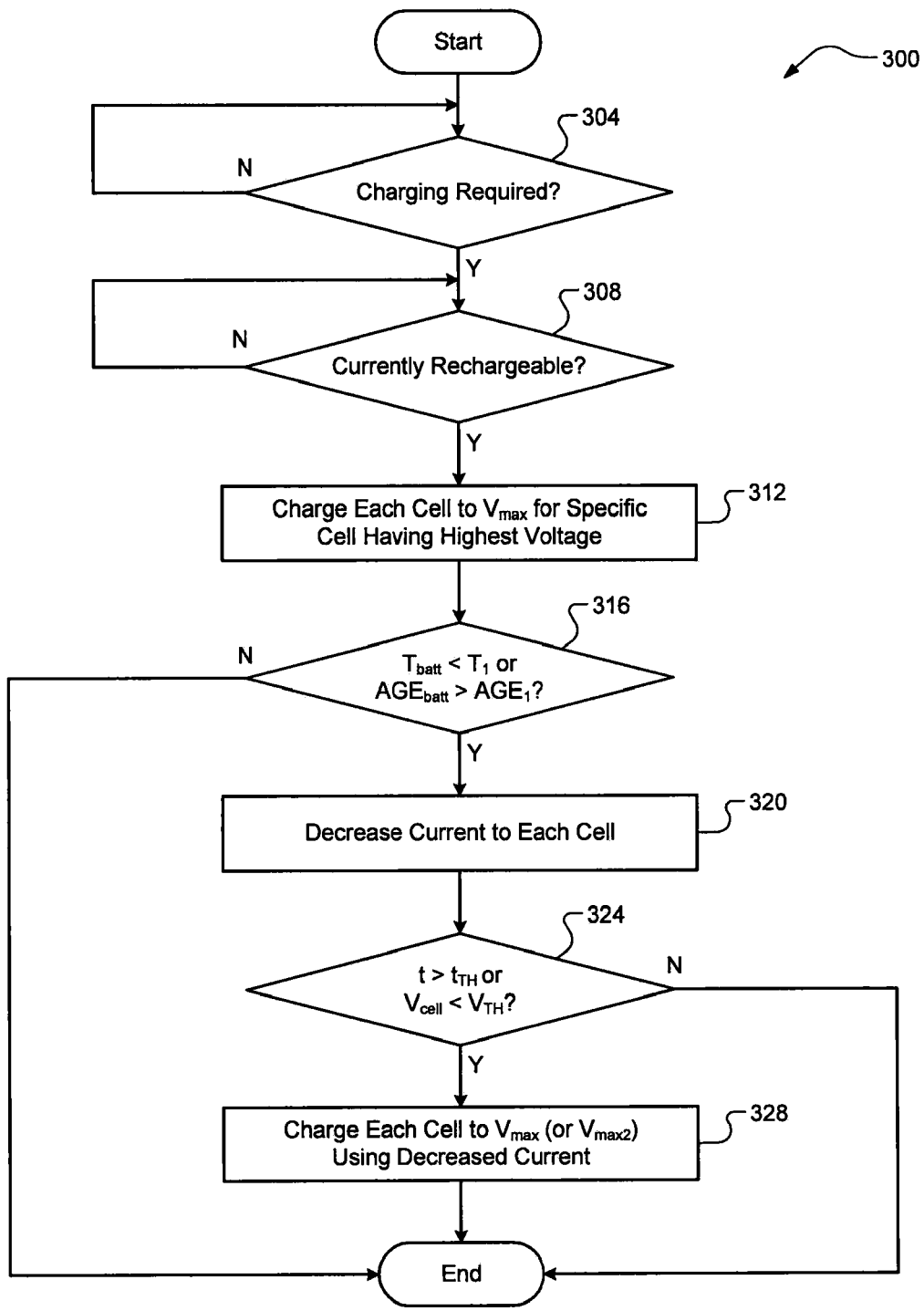
FIG. 3 is a flow diagram of a technique for controlling battery pack recharging according to the principles of the present disclosure.

Referring now to FIG. 3, a flow diagram of a technique 300 for controlling battery pack recharging is illustrated. At 304, the controller 104 can detect whether recharging of the battery pack 124 is required. If recharging is required, the technique 300 can proceed to 308. If charging is not required, the technique 300 can end or return to 304. At 308, the controller 104 can detect whether the battery pack 124 is currently operable for recharging. If the battery pack 124 is rechargeable, the technique 300 can proceed to 308. If the battery pack 124 is not currently rechargeable, the technique 300 can end or return to 308. At 312, the controller 104 can command the external charging unit 136 to charge each cell 220 of the battery pack 124 to the predetermined voltage $V_{max}$ for the specific cell 220 that has a highest voltage prior to recharging.

At 316, the controller 104 can determine whether the battery temperature $T_{batt}$ is less than the first temperature $T_1$ or the battery age $AGE_{batt}$ is less than the first age $AGE_1$. If neither of these conditions is true, the controller 104 can determine that the battery pack 124 is fully charged and the technique 300 can end. If at least one of these conditions is true, however, the technique 300 can proceed to 320. At 320, the controller 104 can command the external charging unit 136 to decrease the current supplied to each cell 220 from the first current $I_1$ to the second current $I_2$. For example, the second current $I_2$ may be zero, and this period can be referred to as a rest period. During this period, the controller 104 can monitor the duration t of the period, i.e., a period since the current was decreased to the second current $I_2$, and the voltage of the specific cell 220 $V_{cell}$.

At 324, the controller 104 can determine whether the predetermined period $t_{TH}$ has elapsed, i.e., the duration t is greater than the predetermined period $t_{TH}$, or the voltage $V_{cell}$ is less than the voltage threshold $V_{TH}$. If the predetermined period $t_{TH}$ has elapsed and/or the voltage $V_{cell}$ is less than the voltage threshold $V_{TH}$, the technique 300 can proceed to 328. Otherwise, the controller 104 can determine that the battery pack 124 is fully charged and the technique 300 can end. At 328, the controller 104 can command the external charging unit 136 to recharge each cell 220 at a current less than the first current $I_1$, e.g., the third current $I_3$. The controller 104 can then determine that the battery pack 124 is fully charged and the technique 300 can then end or return to 304 for one or more additional cycles.

As previously mentioned, it should be appreciated that the technique 300 could repeat a similar process as steps 316 to 332 for one or more additional iterations. More specifically, the technique 300 could further include determining whether the temperature $T_{batt}$ or the age $AGE_{batt}$ exceeds the more extreme thresholds $T_2$ and $AGE_2$. If at least one of these conditions were true, the technique 300 could include waiting for another rest period ($t_{TH}$ or similar) or determine whether the voltage $V_{cell}$ fell below the voltage threshold ($V_{TH}$ or similar). If true, the technique 300 could include recharging each cell 220 to the predetermined voltage $V_{max}$ using an even lesser current, e.g., the fifth current $I_5$, which is less than the third current $I_3$. This process could then be repeated again, up to as many times as desired.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
    detecting, at a controller of an electric vehicle, the controller including one or more processors, that (i) a battery pack of the electric vehicle requires recharging and (ii) the battery pack is currently operable to be recharged by an external charging unit, the battery pack including a plurality of cells;
    identifying, at the controller, a specific cell of the plurality of cells that has a highest voltage in response to the detecting; and
    commanding, by the controller, the external charging unit to recharge each cell of the battery pack to a predetermined voltage that is a sum of (i) a maximum open circuit voltage of the specific cell and (ii) a voltage based on a resistance of the specific cell and a first current supplied to the specific cell.

2. The method of claim 1, further comprising:
    determining, at the controller, at least one of a temperature of the specific cell and an age of the specific cell; and
    selectively commanding, by the controller, the external charging unit to adjust a current supplied to each cell of the battery pack based on at least one of the temperature of the specific cell and the age of the specific cell.

3. The method of claim 2, wherein the controller selectively commands the external charging unit to supply zero current to each cell of the battery pack based on at least one of the temperature of the specific cell and the age of the specific cell.

4. The method of claim 3, wherein selectively commanding the external charging unit to adjust the current supplied to each cell of the battery pack includes commanding, by the controller, the external charging unit to decrease the current supplied to each cell to less than the first current when the temperature of the specific cell is less than a first predetermined temperature.

5. The method of claim 3, wherein selectively commanding the external charging unit to adjust the current supplied to each cell of the battery pack includes commanding, by the controller, the external charging unit to decrease the current supplied to each cell to less than the first current when the age of the specific cell is greater than a first predetermined age.

6. The method of claim 2, further comprising commanding, by the controller, the external charging unit to recharge each cell of the battery pack to the predetermined voltage at a second current that is less than the first current when (i) a predetermined period has elapsed or (ii) a voltage of the specific cell is less than a voltage threshold.

7. The method of claim 6, further comprising determining, at the controller, whether (i) the temperature of the specific cell is less than a second predetermined temperature that is less than the first predetermined temperature or (ii) the age of the specific cell is greater than a second predetermined age that is greater than the first predetermined age.

8. The method of claim 6, further comprising commanding, by the controller, the external charging unit to decrease the current supplied to each cell of the battery pack to less than the second current when the temperature of the specific cell is less than the second predetermined temperature or the age of the specific cell is greater than the second predetermined age.

9. The method of claim 8, wherein the controller commands the external charging unit to supply zero current to each cell of the battery pack when the temperature of the specific cell is less than the second predetermined temperature or the age of the specific cell is greater than the second predetermined age.

10. The method of claim 8, further comprising commanding, by the controller, the external charging unit to recharge each cell of the battery pack to the predetermined voltage at a third current that is less than the second current when (i) the predetermined period has elapsed or (ii) the voltage of the specific cell is less than the voltage threshold.

11. The method of claim 10, wherein the predetermined period has a duration such that the external charging unit is able to recharge each cell of the battery pack to the predetermined voltage using the second or third currents.

12. The method of claim 2, further comprising estimating, at the controller, the age of the specific cell based on a resistance of the specific cell.

13. The method of claim 12, further comprising:
estimating, at the controller, a state of health (SOH) of the specific cell by dividing the resistance of the specific cell by a resistance of the specific cell at a beginning of its life to obtain an estimated SOH; and
estimating, at the controller, the age of the specific cell based on the estimated SOH.

14. The method of claim 13, wherein the age of the specific cell is estimated based on the estimated SOH by calculating:

$$AGE = (300\%/SOH_R) - 200\%$$

where AGE represents the age of the specific cell as a percentage of full life and $SOH_R$ represents the estimated SOH.

15. The method of claim 1, further comprising determining, at the controller, the predetermined voltage using a look-up table that includes varying predetermined values for the predetermined voltage based on various values for the first current.

16. A method, comprising:
detecting, at a controller of an electric vehicle, the controller including one or more processors, that (i) a battery pack of the electric vehicle requires recharging and (ii) the battery pack is currently operable to be recharged by an external charging unit, the battery pack including a plurality of cells;
identifying, at the controller, a specific cell of the plurality of cells that has a highest voltage in response to the detecting;
commanding, by the controller, the external charging unit to recharge each cell of the battery pack to a predetermined voltage that is a sum of (i) a maximum open circuit voltage of the specific cell and (ii) a voltage based on a resistance of the specific cell and a first current supplied to the specific cell;
determining, at the controller, a temperature of the specific cell and an age of the specific cell;
determining, at the controller, that the recharging of each cell of the battery pack is complete when the temperature is greater than or equal to a first predetermined temperature and the age is less than or equal to a first predetermined age;
commanding, by the controller, the external charging unit to decrease a current supplied to each cell of the battery pack to zero when the temperature is less than the first predetermined temperature or the age is greater than the first predetermined age;
determining, at the controller, that the recharging of each cell of the battery pack is complete when a voltage of the specific cell is greater than or equal to a voltage threshold; and
commanding, by the controller, the external charging unit to recharge each cell of the battery pack to the predetermined voltage at a second current that is less than the first current when a predetermined period has elapsed or the voltage of the specific cell is less than the voltage threshold.

17. The method of claim 16, further comprising determining, at the controller, whether (i) the temperature of the specific cell is less than a second predetermined temperature that is less than the first predetermined temperature or (ii) the age of the specific cell is greater than a second predetermined age that is greater than the first predetermined age.

18. The method of claim 16, further comprising commanding, by the controller, the external charging unit to decrease the current supplied to each cell of the battery pack to zero when the temperature of the specific cell is less than the second predetermined temperature or the age of the specific cell is greater than the second predetermined age.

19. The method of claim 18, further comprising commanding, by the controller, the external charging unit to recharge each cell of the battery pack to the predetermined voltage at a third current that is less than the second current when (i) the predetermined period has elapsed or (ii) the voltage of the specific cell is less than the voltage threshold.

20. The method of claim 16, further comprising determining, at the controller, the predetermined voltage using a look-up table that includes varying predetermined values for the predetermined voltage based on various values for the first current.

* * * * *